No. 649,340. Patented May 8, 1900.
C. W. NELSON.
TRAP.
(Application filed Jan. 3, 1900.)
(No Model.)
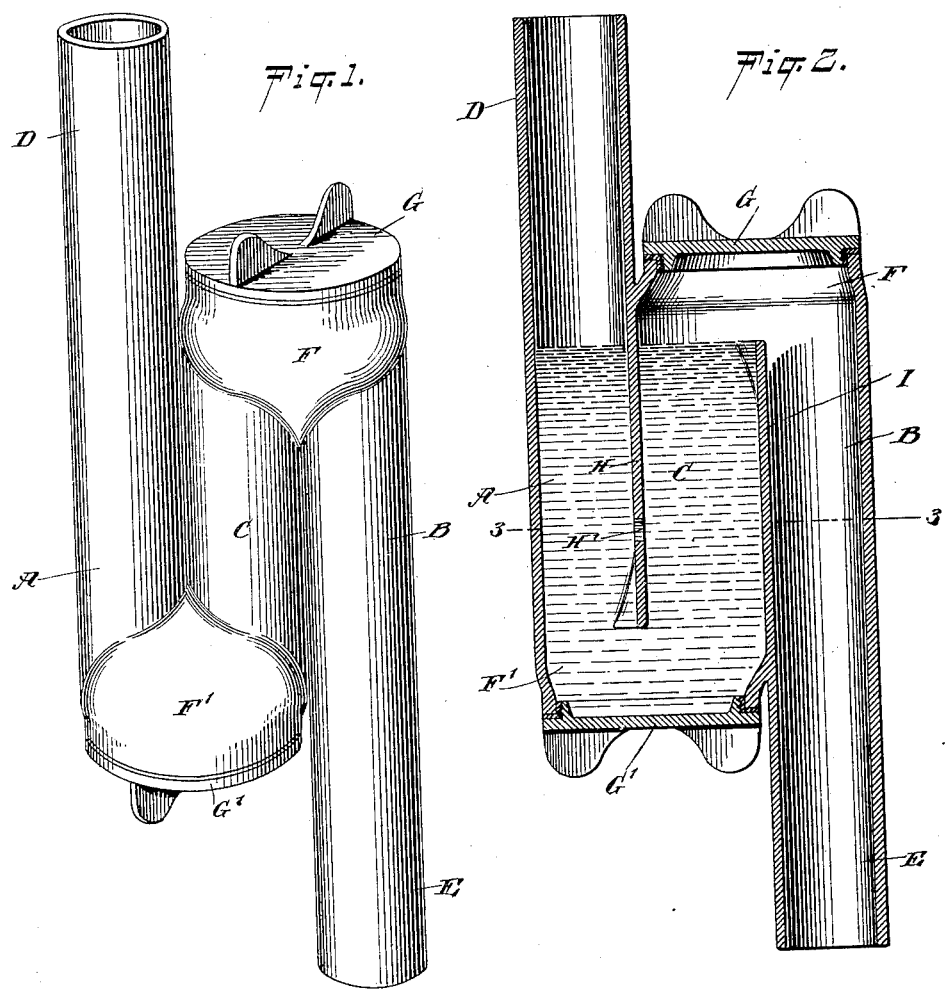
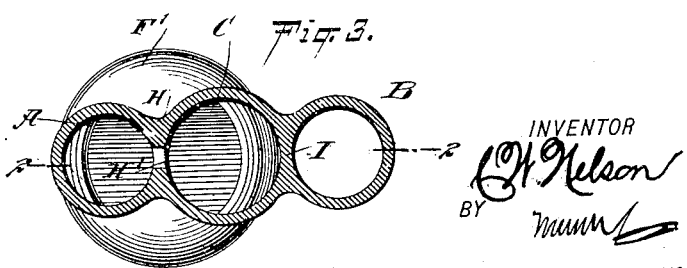

UNITED STATES PATENT OFFICE.

CHRIS W. NELSON, OF NEENAH, WISCONSIN.

TRAP.

SPECIFICATION forming part of Letters Patent No. 649,340, dated May 8, 1900.

Application filed January 3, 1900. Serial No. 286. (No model.)

*To all whom it may concern:*

Be it known that I, CHRIS W. NELSON, a citizen of the United States, and a resident of Neenah, in the county of Winnebago and State of Wisconsin, have invented a new and Improved Trap, of which the following is a full, clear, and exact description.

The invention relates to sanitary plumbing; and its object is to provide a new and improved trap more especially designed for use on kitchen-sinks, urinals, lavatories, and other plumbing fixtures and which is simple and durable in construction and arranged to prevent dry siphoning and to allow of conveniently cleaning the trap whenever deemed necessary.

The invention consists of novel features and parts and combinations of the same, as will be fully described hereinafter and then pointed out in the claim.

A practical embodiment of my invention is represented in the accompanying drawings, forming a part of this specification, in which similar characters of reference indicate corresponding parts in all the views.

Figure 1 is a perspective view of the improvement. Fig. 2 is a sectional side elevation of the same on the line 2 2 in Fig. 3, and Fig. 3 is a sectional plan view of the same on the line 3 3 in Fig. 2.

The improved trap is provided with an inlet-chamber A, an outlet-chamber B, and a trap-chamber C, located between the chambers A and B and in communication at its lower end with the chamber A and at its upper end with the chamber B. The upper end of the chamber A is connected with an inlet-pipe D, and the lower end of the chamber B is connected with a discharge-pipe E, and the upper ends of the chambers C and B terminate in and form a circular head F, closed by a screw-plug G, adapted to be unscrewed to give access to both the chambers C and B for cleaning or other purposes. The lower ends of the chambers A and C similarly terminate in a circular head F', closed by a screw-plug G' similar to the screw-plug G and for a like purpose. The partition-wall H between the chambers A and C extends from the head F to within a short distance of the head F', so that the chambers A and C are connected with each other at their lower ends below the said partition H, and in the latter is arranged an aperture H', located a distance above the lower end of the partition H and a distance below the upper end of the partition I between the chambers C and B.

By the arrangement described the trap can be readily cleaned by unscrewing the screw-plugs G G', and dry siphoning of the trap is prevented by having the aperture H' in the partition H, as any suction or siphoning action can draw water from the chambers A and C only until the level of the water has fallen to the aperture H', and consequently the head F', as well as the lower portions of the chambers A and C, remain filled with water, and thus dry siphoning of the trap is impossible.

By forming the ends of the chambers in the circular heads F and F', as described, very large openings are obtained when the screw-plugs G G' are removed to permit of conveniently and thoroughly cleaning the chambers of the trap. The trap can be made of metal, earthenware, or other suitable material.

Having thus fully described my invention, I claim as new and desire to secure by Letters Patent—

A trap, comprising a cylindrical inlet-chamber arranged at its lower end for connection with an inlet-pipe, an outlet-chamber arranged at its upper end for connection with an outlet-pipe, and a cylindrical trap-chamber located between the inlet and outlet chambers, and communicating with the upper end of the outlet-chamber, and with the lower end of the inlet-chamber, the cylindrical trap-chamber having its periphery contiguous to that of the inlet-chamber and being separated therefrom by a partition having an aperture above its lower end, the upper ends of the outlet-chamber and trap-chamber forming together a circular head, and the lower ends of the trap-chamber and inlet-chamber likewise forming together a circular head, and screw-plugs for closing said heads, substantially as shown and described.

In testimony whereof I have signed my name to this specification in the presence of two subscribing witnesses.

CHRIS W. NELSON.

Witnesses:
L. M. COOK,
E. W. THURSTON.